United States Patent
Schott et al.

(10) Patent No.: US 7,761,233 B2
(45) Date of Patent: Jul. 20, 2010

(54) APPARATUS AND METHOD FOR MEASURING THE ACCURATE POSITION OF MOVING OBJECTS IN AN INDOOR ENVIRONMENT

(75) Inventors: Wolfgang Hans Schott, Rueschlikon (CH); Simeon Furrer, Mountain View, CA (US); Beat Weiss, Edlibach (CH)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/428,019

(22) Filed: Jun. 30, 2006

(65) Prior Publication Data

US 2008/0004796 A1    Jan. 3, 2008

(51) Int. Cl.
  *G01C 21/20* (2006.01)
(52) U.S. Cl. ............................................. 701/221
(58) Field of Classification Search ............... 701/201
  See application file for complete search history.

(56) References Cited

U.S. PATENT DOCUMENTS

| | | | | |
|---|---|---|---|---|
| 3,702,477 | A * | 11/1972 | Brown | 342/451 |
| 6,163,021 | A * | 12/2000 | Mickelson | 244/3.2 |
| 6,192,312 | B1 * | 2/2001 | Hummelsheim | 701/118 |
| 6,246,960 | B1 * | 6/2001 | Lin | 701/214 |
| 6,317,683 | B1 * | 11/2001 | Ciprian et al. | 701/118 |
| 6,415,223 | B1 * | 7/2002 | Lin et al. | 701/208 |
| 6,493,631 | B1 * | 12/2002 | Burns | 701/220 |
| 6,496,778 | B1 * | 12/2002 | Lin | 701/215 |
| 6,735,523 | B1 * | 5/2004 | Lin et al. | 701/216 |
| 7,587,277 | B1 * | 9/2009 | Wells | 701/220 |
| 2002/0029110 | A1 * | 3/2002 | Fukuda et al. | 701/213 |
| 2002/0109628 | A1 * | 8/2002 | Diesel | 342/357.14 |
| 2002/0120400 | A1 * | 8/2002 | Lin | 701/214 |
| 2003/0149528 | A1 * | 8/2003 | Lin | 701/214 |
| 2003/0176970 | A1 * | 9/2003 | Lin | 701/214 |
| 2005/0046608 | A1 * | 3/2005 | Schantz et al. | 342/127 |
| 2005/0143916 | A1 * | 6/2005 | Kim et al. | 701/214 |
| 2005/0203701 | A1 * | 9/2005 | Scherzinger | 701/207 |
| 2005/0234644 | A1 * | 10/2005 | Lin | 701/214 |
| 2006/0055584 | A1 * | 3/2006 | Waite et al. | 342/22 |
| 2006/0100781 | A1 * | 5/2006 | Lin et al. | 701/216 |
| 2006/0287824 | A1 * | 12/2006 | Lin | 701/214 |
| 2006/0293854 | A1 * | 12/2006 | Chiou et al. | 701/301 |
| 2007/0016371 | A1 * | 1/2007 | Waid et al. | 701/213 |
| 2007/0241965 | A1 * | 10/2007 | Kolavennu et al. | 342/465 |
| 2007/0271037 | A1 * | 11/2007 | Overstreet et al. | 701/220 |
| 2007/0282565 | A1 * | 12/2007 | Bye et al. | 702/158 |
| 2007/0294032 | A1 * | 12/2007 | Zumsteg et al. | 701/213 |

\* cited by examiner

*Primary Examiner*—Thomas G Black
*Assistant Examiner*—Shelley Chen
(74) *Attorney, Agent, or Firm*—Michael J. Buchenhorner; Stephen C. Kaufman

(57) ABSTRACT

An apparatus and method is disclosed for efficiently sensing and tracking objects in an indoor environment by simultaneously measuring the object movement with an inertial navigation system and a reference location positioning system. By combining the measurements obtained with accelerometers, gyroscopes, angle estimators and the reference system using an extended Kalman filter based approach, a position estimate is obtained with high reliability and precision accuracy. Improvement in performance is obtained by the incorporation of dynamic mode switching and forward-backward smoothing in the location position estimator.

11 Claims, 4 Drawing Sheets

APPARATUS AND METHOD FOR MEASURING THE ACCURATE POSITION OF MOVING OBJECTS IN AN INDOOR ENVIRONMENT

FIELD OF INVENTION

The instant invention relates to an apparatus and method for measuring the accurate position of moving objects in an indoor environment.

BACKGROUND OF THE INVENTION

Location sensing and tracking of moving objects has created a growing interest in numerous novel location based services and applications in various market segments. In the retail industry, for example, shopping carts equipped with personal shopping assistants enriched with some additional navigation functionality can guide customers through the store, provide them with location-based product information, and alert them to promotions and discounts as they walk through the aisles. However, customers will be satisfied only if this advanced shopping service can offer a tracking system which will accurately sense the location of the shopping cart. Determining at least the aisle in which the cart is located is crucial for obtaining customer satisfaction. The stringent requirement for estimating the location of the cart with an accuracy of less than one meter is a challenging situation. In addition, to make this system commercially viable it is essential that the total cost should be kept low.

Location tracking of objects in an indoor environment can be performed with various techniques, which can be based on mechanical, acoustical, ultra-sonic, optical, infrared, inertial, or radio-signal measurements. Among these systems, radio-based location positioning systems are most frequently used to sense and track the position of moving objects in an indoor environment. A radio receiver attached to the objects either measures the signal strength, the angle of arrival, or the arrival-time difference of received radio signals that are transmitted of multiple pre-installed reference transponder units. Since the locations of the radio transponders are known, a triangulation or signature method can be applied to determine the physical location of the moving object. The location estimates obtained with a radio-based location-positioning system are long-term stable, but are rather infrequently updated and suffer under a large error variance due the fading radio channel. Location estimates from measurements obtained with an Inertial Navigation System (INS), which comprises accelerometers, gyroscopes, and compass, are frequently applied in an outdoor environment (often in conjunction with the global positioning system) to track maneuverable vehicles like land crafts, aircrafts, and ships. INS systems can also be used for location tracking of objects in an indoor environment. These estimates are rather reliable, well-suited for short-term tracking, even though they suffer from drifts due to the integration operation required for the derivation of the location position from the acceleration and angular rate.

The present invention overcomes these problems and presents a solution for accurately estimating the position of a moving object in an indoor environment.

The following patents and papers are of particular interest for the disclosed tracking scheme:

The document U.S. Pat. No. 6,205,401 titled "Navigation system for a vehicle especially a land craft" describes a navigation system for a land vehicle, comprising one gyroscope, two accelerometers, and a velocity measurement device. In addition, a GPS receiver and/or map can provide position reference data. A Kalman-filter based approach is used to determine from the inertial measurements and the reference data the vehicle position and the direction of travel. The drawback of this invention is that it cannot be applied in an indoor environment because the reception of satellite signals within buildings is unreliable or even impossible due to wall shielding effects. Another document WO 2004/017569A3, titled "Transponder subsystem for supporting location awareness in wireless networks", discusses an apparatus and method for determining the location of a communication device within an IEEE 802.11 standard based WLAN. The apparatus comprises transponders for communicating with the device when it is situated in the coverage area of the WLAN, and a processing unit for deriving the location of the device in dependence on information received from the transponders. For the determination of the location, measurement parameters such as received signal strength and/or time delay from a radio signal exchange between the device and transponders can be used. Adding inertial sensors to the positioning apparatus, and combining the radio-signal and inertial measurements with a Kalman-filter approach as proposed in the present invention can significantly enhance the positioning accuracy and reliability of the proposed method. The paper titled "Estimating optimal tracking filter performance for maneuvering targets" published in IEEE Transactions on Aerospace and Electronic Systems, vol 6, no 4, July 1970, deals with optimal tracking of manned maneuverable vehicles such as aircrafts, ships, and submarines. A Kalman-filter has been derived using a simple process model that closely represents the motions of the maneuvering targets in the 3-dimensional space. This paper describes the method of deriving from a continuous-time state-space description the equivalent discrete-time equations. However, the paper does not consider mode switching or forward-backward smoothing to enhance the accuracy of the vehicle tracker.

OBJECT AND SUMMARY OF THE INVENTION

Various studies have shown that neither an inertial navigation system (INS) nor a radio-based positioning system can provide position estimates with the desired precision accuracy in an indoor environment. The present invention provides a method and apparatus that deploys and merges the location information obtained with a radio-based (or any other reference) positioning system and an inertial navigation system with a novel data fusion mechanism. This leads to a solution that offers higher accuracy and improved reliability than the application of any of the two basic type-specific solutions. Significant improvements in the position accuracy can only be gained if the parameters of the INS system leading to bias and drift in the location position can be reliably estimated and controlled, and the noise in the radio measurements introduced by radio channel effects can be eliminated. This task can be solved in an optimal way by, firstly, modeling the generation process of acceleration, bias, velocity, and position with a common state-space model and, secondly, estimating the position location from the measured data with an extended Kalman-filter approach. This novel approach provides gains in terms of position accuracy by, firstly, dynamically switching the Kalman-filter between several modes of operation and, secondly, incorporating a forward-backward smoothing mechanism into the Kalman-filter based location position estimator.

The object of the instant invention is to provide an apparatus and method to accurately estimate the position of a moving object in an indoor environment.

Another object of the invention is to simultaneously measure the movement of the object with an inertial navigation system and a reference positioning system, and optimally combine the measurements with an extended Kalman-filter based approach.

Another aspect of the present invention is the dynamic switching of the extended Kalman-filter between several modes of operation.

Yet another aspect of the present invention is the incorporation of forward-backward smoothing mechanism in the position estimation approach.

Accordingly, the present invention provides an apparatus for providing accurate position of a moving object in an indoor environment, which comprises:
  a Reference Positioning System (RPS)
  an Inertial Measurement Unit (IMU) installed on said moving object.
  a Coordinate Transformer (COT) coupled to the outputs of said IMU, and
  a Location Position Estimator (LPE) coupled to the outputs of said RPS and said COT.

Further, the present invention provides a method for accurately determining the position of a moving object in an indoor environment using a combination of an Inertial Measurement Unit (IMU) and a Reference Positioning System (RPS), comprising the steps of:
  obtaining reference position data from said RPS,
  obtaining additional data on moving object from said IMU, and
  estimating the position of the moving object from the data obtained from the RPS and the IMU.

BRIEF DESCRIPTIONS OF THE DRAWINGS

The present invention is described with the help of accompanying drawings.

DETAILED DESCRIPTION OF THE INVENTION

Figure 1:
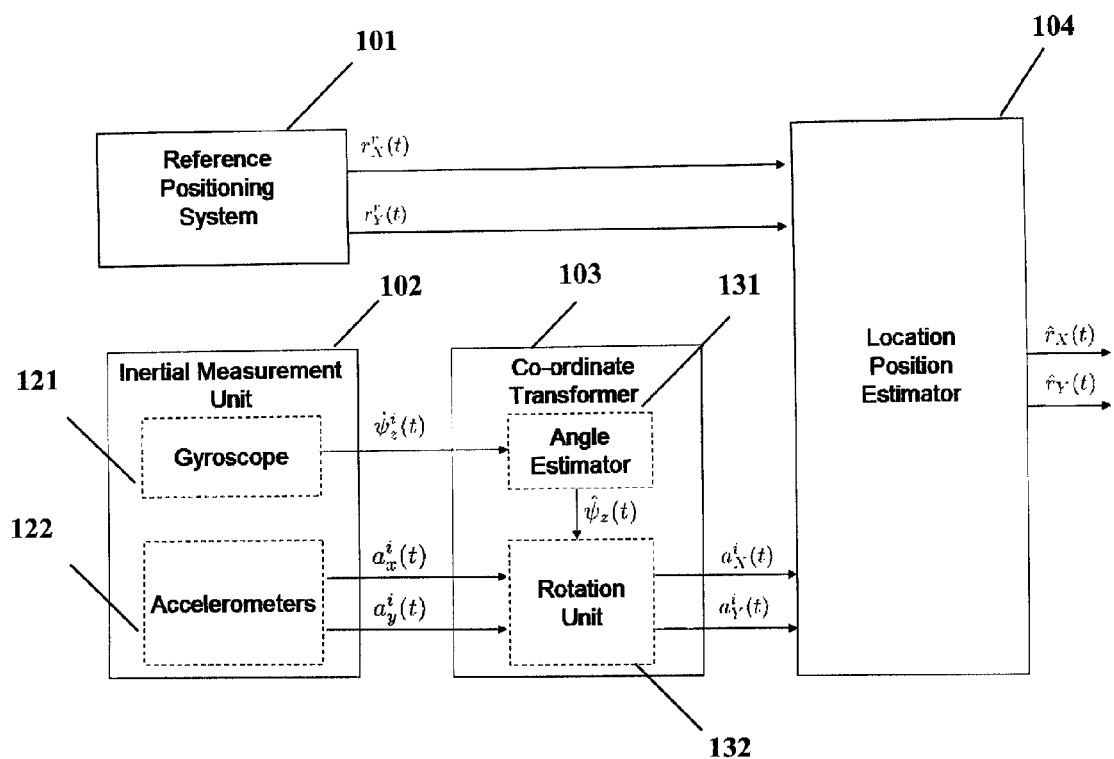
FIG. 1 shows the present invention on location tracking system.

The present invention provides an apparatus and method for measuring the position of moving objects with an inertial navigation system, a reference positioning system, and a Kalman-filter based fusion mechanism, which leads to a solution that offers higher accuracy and improved reliability than the application of any of the two basic type-specific location positioning solutions. FIG. 1 shows the preferred embodiment of the location tracking system under consideration. It comprises a reference positioning system 101, an inertial measurement unit 102 with a gyroscope 121 and accelerometers 122, a co-ordinate transformer 103 with an angle estimator 131 and rotation unit 132, and a location position estimator 104. The outputs of the reference positioning system 101 and co-ordinate transformer 103 are connected to the location position estimator 104. The reference positioning system 101 provides estimates $r^r_X(t)$ and $r^r_Y(t)$ on the current position of the object in a target co-ordinate system (X,Y). The estimates are updated not necessarily continuously in time, but whenever new position measurements are available. Each estimate $r^r(t)$ randomly deviates from the position $r(t)$ of the object according to following relation $$r^r(t) = r(t) + \upsilon_r(t),$$

where $\upsilon_r(t)$ is additive white Gaussian noise (AWGN) with a variance $\sigma^2_{\upsilon r}$. The inertial measurement unit 102 as disclosed above measures acceleration and angular velocity in a right-handed Cartesion co-ordinate system (x,y,z) that is body-fixed to the inertial measurement unit 102. In present embodiment, the inertial measurement unit 102 is mounted on the object in such a way that the z-axis is pointing in the opposite direction of the gravity vector; therefore, any movement of the object on a plain floor can be tracked with one gyroscope 121 and two accelerometers 122. Accelerometers 122 provide real-time measurements of acceleration components $a^i_x(t)$ and $a^i_y(t)$ of the moving object in x-and y-direction. As these measurements are rather noisy due to the vibrations of the object and often biased by a non-negligible, time-varying offset, each measurement $a^i(t)$ is generated from the acceleration a(t) and bias b(t) according to the equation $$a^i(t) = a(t) + b(t) + \upsilon_a(t),$$

where $\upsilon_a(t)$ is additive white Gaussian noise (AWGN) with a variance $\sigma^2_{\upsilon a}$.

The gyroscope 121 measures the angular velocity $\hat{\psi}^i_z(t)$ around the z-axis. Based on this noisy measurement, the angle estimator 131 continuously estimates the rotation angle $\hat{\psi}^i_z(t)$. In a low-noise environment, this operation can be performed with an integrator. The output value of angle estimator 131 has to be initialized so that the x-and y-axis are aligned to the target co-ordinate system (X,Y). After this initial calibration step, the rotation unit 132 continuously transforms the measurements $a^i_x(t)$ and $a^i_y(t)$ to the target co-ordinate system by $$\begin{bmatrix} a^i_X(t) \\ a^i_Y(t) \end{bmatrix} = \begin{bmatrix} \cos(\hat{\psi}^i_x) & -\sin(\hat{\psi}^i_x) \\ \sin(\hat{\psi}^i_x) & \cos(\hat{\psi}^i_x) \end{bmatrix} \begin{bmatrix} a^i_x(t) \\ a^i_y(t) \end{bmatrix}$$

Figure 2:
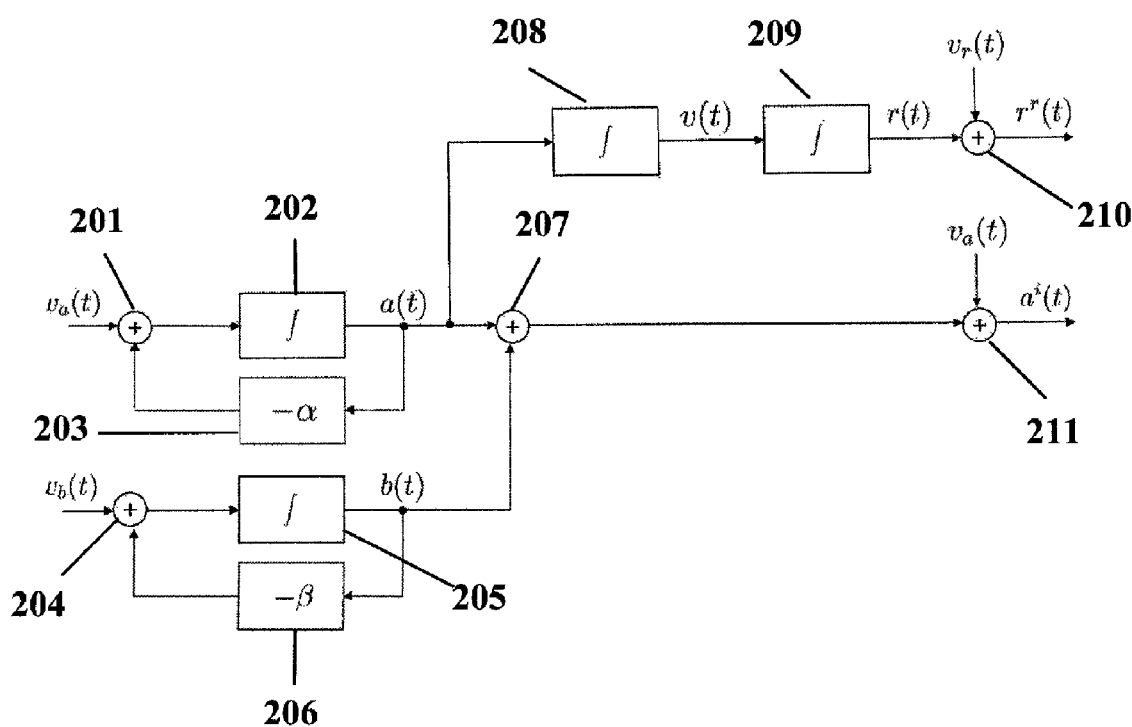
FIG. 2 shows the process and measurement model for moving object in presence of reference signal.

The dynamic and random movements of the object along the X-and Y-axis of the target co-ordinate system and the resulting signals provided by the inertial measurement unit 102 with co-ordinate transformer 103 and the reference positioning system 101 can be modelled as shown in FIG. 2. The acceleration a(t) of the object along one axis of the co-ordinate system is modelled by a first-order Markov process defined by $$\dot{a}(t) = -\alpha a(t) + w_a(t), \alpha \geq 0$$

where $w_a(t)$ represents white Gaussian noise with variance $\sigma^2_{wa}$. $\alpha$ defines the correlation between successive acceleration values and is inversely proportional to the time maneuver constant of the object.

Similarly, a time-dependent bias b(t) introduced by sensor imperfections can be modelled by $$\dot{b}(t) = -\beta b(t) + w_b(t), \beta \geq 0$$

where $w_b(t)$ is additive white Gaussian noise (AWGN) with variance $\sigma_{wb}^2$. The correlation coefficient $\beta$, however, takes on a larger value than $\alpha$ because the bias b(t) changes with a much slower rate than the acceleration a(t). The position r(t) of the object, which is modeled at the output of the integrator 209, relates to its acceleration a(t), which is modeled at the output of the integrator 202, according to $$\ddot{r}(t) = \dot{\upsilon}(t) = a(t)$$

where $\upsilon(t)$ denotes the velocity of the object.

The above three linear differential equations represent the continuous-time process model of the investigated system, which can be written in the state-space form $$\dot{x}(t)=Fx(t)+Gw(t)$$

where the state vector x(t), the process noise w(t), and the corresponding matrices F and G are given by $$x(t) = \begin{bmatrix} r(t) \\ \upsilon(t) \\ a(t) \\ b(t) \end{bmatrix}, F = \begin{bmatrix} 0 & 1 & 0 & 0 \\ 0 & 0 & 1 & 0 \\ 0 & 0 & -\alpha & 0 \\ 0 & 0 & 0 & -\beta \end{bmatrix},$$

$$w(t) = \begin{bmatrix} w_a(t) \\ w_b(t) \end{bmatrix}, G = \begin{bmatrix} 0 & 0 \\ 0 & 0 \\ 0 & 1 \\ 1 & 0 \end{bmatrix}$$

The measurement model is chosen in accordance with equations $r^i(t)=r(t)+v_r(t)$ and $a^i(t)=a(t)+b(t)+\upsilon_a(t)$ as $$z(t)=Hx(t)+v(t),$$

where the output vector z(t), measurement noise v(t), and the matrix H are given by $$z(t) = \begin{bmatrix} a^i(t) \\ r^i(t) \end{bmatrix}, H = \begin{bmatrix} 0 & 0 & 1 & 1 \\ 1 & 0 & 0 & 0 \end{bmatrix},$$

$$v(t) = \begin{bmatrix} \upsilon_a(t) \\ \upsilon_r(t) \end{bmatrix}$$

The process and measurement models given by above two equations reflects the behavior of the system if the object is moving and location estimates are provided by the reference positioning system. If the object is stationary, a different model for the dynamic behaviour of the object can be obtained by incorporating the constraint $a(t)=\upsilon(t)=0$ into the system matrix F of the process model as explained above. Similarly, if reference location position estimates are not available, the matrix H in the measurement model can be modified so that the signal $r^i(t)$ in the output vector z(t) is set to 0.

Figure 3:
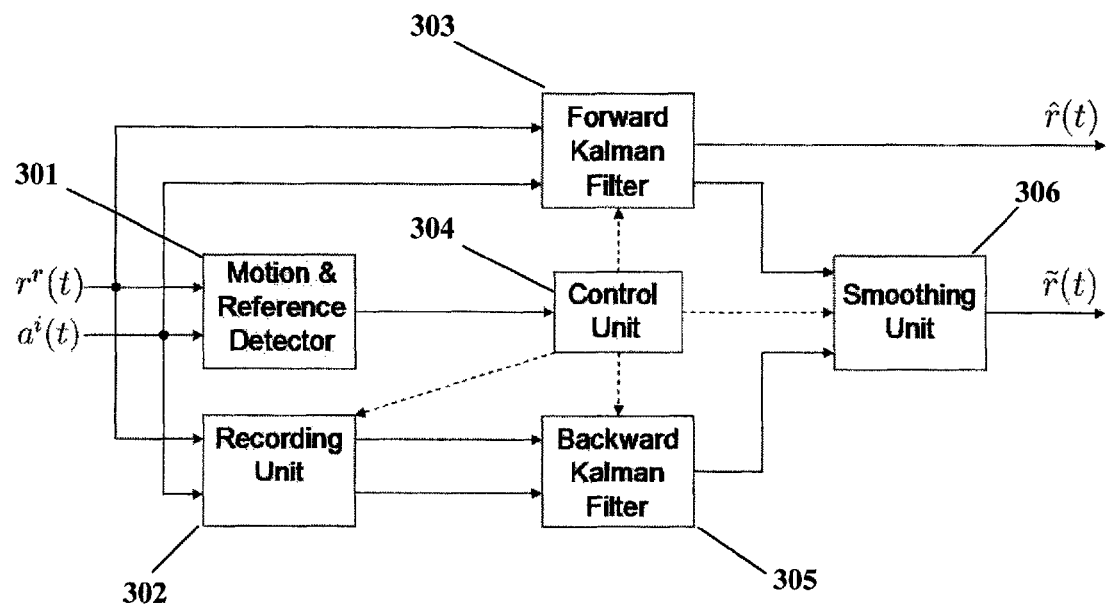
FIG. 3 shows the location position estimator.

FIG. 3 elaborates the location position estimator 104 in FIG. 1, where the output signals from reference positioning system 101 and co-ordinate transformer 103 are connected to the forward Kalman-filter 303 for providing location-position estimates $\hat{r}(t)$ in real-time, the backward Kalman-filter 305 with a recording 302 and smoothing 306 unit for providing optimal smoothed estimates $\tilde{r}(t)$, and the motion and reference detector 301 with the control unit 304 for controlling the operation of the estimator 104. Here in this section the proposed location-positioning method and corresponding approach are only given for one dimension of the target co-ordinate system (X,Y).

The forward Kalman-filter 303 continuously monitors the noisy measured signals acceleration $a^i(t)$ and reference position $r^i(t)$ and computes in real-time a location-position estimate $\hat{r}(t)$ of the object based on a chosen process and measurement model. This is achieved by, firstly, replicating the process and measurement model without noise sources in the Kalman-filter 303 to generate a state vector estimate $\hat{x}(t)$ and a corresponding output vector $\hat{z}(t)=H\hat{x}(t)$ and, secondly, continuously updating the state vector estimate according to $$\dot{\hat{x}}(t)=F\hat{x}(t)+K(t)[z(t)-\hat{z}(t)]$$

$\hat{x}(t)$ is an optimal estimate of the state vector x(t) with respect to a mean-squared error criterion. The Kalman-filter 303 is driven by the error between the measured signal vector z(t) and the reconstructed output vector $\hat{z}(t)$ weighted by the Kalman gain matrix K(t). For obtaining the optimum Kalman gain settings, the covariance matrix of the state vector estimation error is computed.

Figure 4:
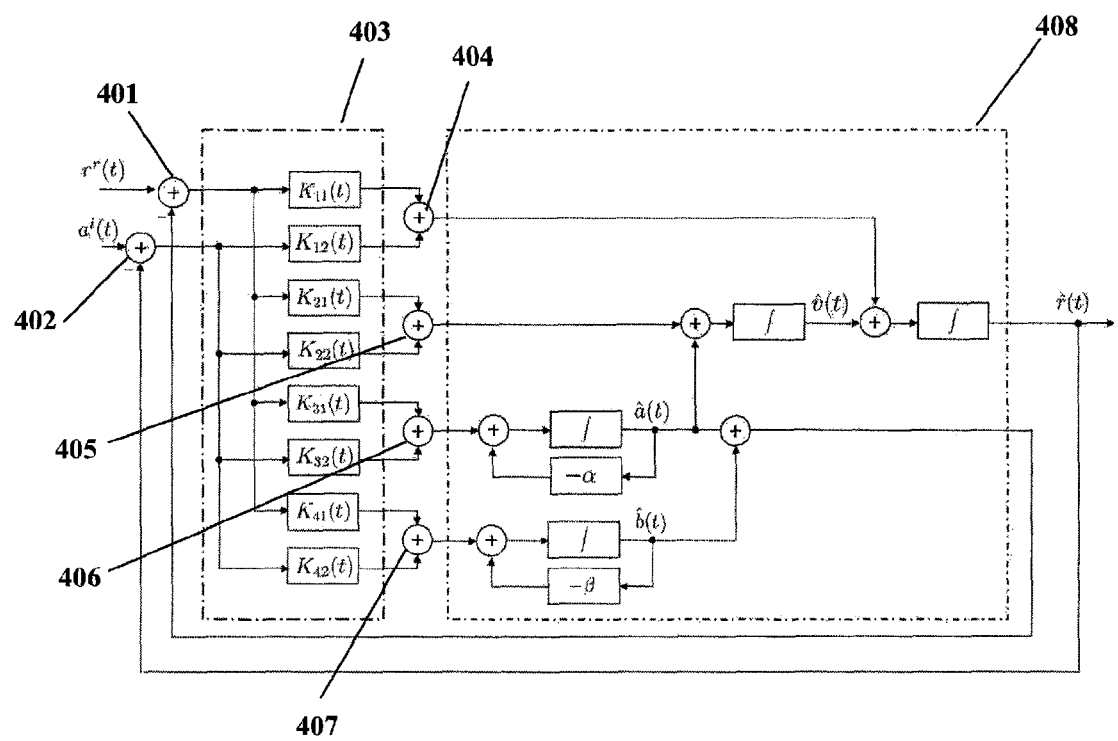
FIG. 4 shows the Kalman-filter designed for moving object in presence of reference signal.

FIG. 4 shows one of the embodiments for realizing the Kalman-filter 303 obtained for the process and measurement model given in corresponding equations as discussed above. The filter 303 comprises eight time-varying Kalman gains $K_{11}(t), K_{12}(t), K_{21}(t) \ldots K_{42}(t)$, two adders 401 and 402 at the input of the Kalman gains, four adders 404 ... 407 at the output of the Kalman gains, and the process and measurement model 408. The estimates for the position $\hat{r}(t)$, velocity $\hat{\upsilon}(t)$, acceleration $\hat{a}(t)$ of the object, and accelerometer bias $\hat{b}(t)$ are provided at the output of four integrators in the process and measurement model 408. Since three of the four integrators are cascaded, the filter 303 is especially sensitive to DC-offsets present at the input of the integrators leading to severe drift effects in the integrator output signals. To avoid this inherent deficiency of the filter solution, additional bias and drift compensation techniques are applied as discussed below.

The forward Kalman-filter 303 provides estimates $\hat{x}(t)$ of the state vector x(t) in real-time by taking into account all information of the measurement signals obtained up to time t. An even better estimate $\tilde{x}(t)$ in terms of estimation accuracy can be obtained by performing forward-backward smoothing. This approach exploits additional information on the state vector which is contained in the measurement signals received after time t. The optimal smoothed estimate $\tilde{x}(t)$ can thus not be computed in real time, but only after some delay required for collecting future measurements and afterwards post-processing all available data. However, this inherent disadvantage of optimal smoothing is of no importance if the state vector does not change its value when the approach is implemented. Therefore, we propose to apply forward-backward smoothing when the object is not moving in order to enhance the precision of state-vector estimates at past time instants and thus significantly improve the accuracy of the estimate of the current position of the object.

The forward-backward smoothing approach can be realized with a recording unit 302, a forward Kalman-filter 303, a backward Kalman-filter 305, and a smoothing unit 306 as shown in FIG. 3. When the object starts moving at any arbitrary time $t_0$, the recording unit 302 starts storing the signals acceleration $a^i(t)$ and reference position $r^i(t)$ until the object stops at time $t_1$. At this time $t_1$, the location position estimator 104 starts performing forward-backward smoothing over the fixed time-interval $[t_0, t_1]$ based on the stored data to obtain optimal smoothed estimates $\tilde{x}(t)$ of the state-vector x(t) for any $t \in [t_0, t_1]$. The forward Kalman-filter 303 is implemented as discussed above. The filter 303 uses at time $t_0$ the initial conditions $\hat{r}(t_0)=r_0$, $\hat{b}(t_0)=b_0$, $\hat{a}(t_0)=\hat{\upsilon}(t_0)=0$, runs forward in time from $t_0$ to t, and computes the forward state vector estimate $\hat{x}^f(t)$. The backward Kalman-filter 305 has the same structure as the forward Kalman-filter 303, but the algorithm runs backward in time from $t_1$ to t. It provides the estimate $\hat{x}^b(t)$. As initial conditions for the backward filter, the acceleration $\hat{a}(t_1)$ and the velocity $\hat{\upsilon}(t_1)$ are set to zero because the object is not moving, while the initial position $\hat{r}(t_1)$ and bias $\tilde{b}(t_1)$ are modelled as Gaussian random variables. The smoothing unit 306 optimally combines the estimates $\hat{x}^f(t)$ provided by the forward Kalman-filter 303 and $\hat{x}^b(t)$ provided by the backward filter 305 to generate the optimal smoothed estimate $\tilde{x}(t)$. The optimal combining of the two estimates is accomplished by relatively weighting the estimates in accordance to the covariance matrices of the corresponding state vector estimation error, which are also provided by the forward Kalman-filter 303 and backward Kalman-filter 305.

The motion and reference detector 301 continuously monitors the acceleration signal $a^i(t)$ and reference position signal $r^r(t)$, firstly, to detect whether the object is in-motion or stationary and, secondly, to decide for the presence-of-reference or absence-of-reference position signal. The second event can also be directly signaled from the reference positioning system 101 to the location position estimator 104. Motion detector 301 detects the object's motion by continuously tracing the magnitude of the acceleration measurement signal $a^i(t)$, which strongly oscillates when the object is moving. The detection can thus be performed by sampling this signal at the rate of 1/T, averaging N consecutive samples, and then deciding for the event object stationary if the obtained mean value is below a pre-defined threshold $\mu$, as defined by $$\overline{a}(kT) = \frac{1}{N}\sum_{l=0}^{N-1}|a^i(kT-lT)|\begin{cases}\leq \mu & \text{no-movement}\\ > \mu & \text{in-motion}\end{cases}$$

The parameters N and $\mu$ are chosen so that even short stops of the object can be reliably detected and false decisions for not moving are avoided.

Depending on the detected events object in-motion/stationary and presence/absence-of-reference position signal, the control unit 304 dynamically switches the Kalman-filters 303 and 305 between the following modes of operation:

Mode 1: Object In-Motion and Presence-of-Reference Position Signal

In this configuration, the control unit 304 enables the operation of the forward Kalman-filter as shown in FIG. 4. The filter 303 provides estimates of the position, acceleration, and velocity of the object as well as estimates of the accelerometer bias in real-time. The acceleration signal $a^i(t)$, reference position signal $r^r(t)$, and the mode parameters are recorded with recoding unit 302 in a storage device in order to perform forward-backward smoothing in Mode 3.

Mode 2: Object In-Motion and Absence-of-Reference Position Signal

Since no reference signal is available, the location position estimator 104 has to derive an estimate which is entirely based on the accelerometer measurements $a^i(t)$. This change can be modelled by setting all elements in the second row of the measurement matrix H to zero. The control unit 304 reconfigures the Kalman-filter 303 so that this change in the measurement model is also reflected in the filter 303.

Moreover, the control unit 304 freezes the bias estimate $\tilde{b}(t)$ in the filter 303 to its current value when the mode of operation if switched from presence-of-reference to absence-of-reference position signal. This freeze operation is recommendable to avoid observability problems of simultaneous changes of acceleration and bias in the system model in the absence of a reference signal. The acceleration signal $a^i(t)$, reference position signal $r^r(t)$, and the mode parameters are recorded in the storage device with recoding unit 302 to perform forward-backward smoothing in Mode 3.

Mode 3: No-Movement of the Object

Whenever the motion detector 301 detects no movement of the object, the control unit 304 resets the acceleration estimate $\hat{a}(t)$ and the velocity estimate $\hat{\upsilon}(t)$ in the Kalman-filter 303 to zero. This operation calibrates the integrator output signals in the process and measurement model 408 to the known reference values of zero, and thus prevents offset accumulation by the integrators. Since the acceleration and velocity of the object is zero, an enhanced process model for the dynamic behavior of the object is obtained by incorporating the constraint $a(t)=\upsilon(t)=0$ into the process equations. The control unit 304 reconfigures the Kalman-filter 303 so that this change in the process model is also reflected in the filter 303. Since the location position estimator 104 has recorded the signals $a^i(t)$ and $r^r(t)$ while the object was moving as explained in Mode 1, the recorded data stored in the last time interval before the object reached its stop can be post-processed by performing forward-backward smoothing with smoothing unit 306. The control unit 304 initializes the execution of the smoothing procedure after the event no-movement has been detected. After post-processing the recorded data, the location position estimator 104 provides the optimal smoothed estimate of the objects location.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an exemplary embodiment thereof, and it is the intention of the following claims to encompass and include such changes.

We claim:

1. An apparatus for providing accurate position of a moving object in an indoor environment, comprising:
    a Reference Positioning System (RPS);
    an Inertial Measurement Unit (IMU) installed on said moving object;
    a Coordinate Transformer (COT) coupled to the outputs of said IMU; and
    a Location Position Estimator (LPE) coupled to the outputs of said RPS and said COT, wherein said LPE comprises, for each dimension of the position coordinates:
    a forward Kalman Filter having one input coupled to the output from the RPS for receiving the reference position signal and a second input coupled to the output from said COT for obtaining the rotated accelerometer measurements;
    a recording unit having one input coupled to the output from the RPS and a second unit coupled to the output from said COT;
    a motion and reference detector having one input coupled to the output from the RPS and a second input coupled to the output from said COT;
    a backward Kalman Filter having its inputs connected to the outputs of said recording unit;
    a smoothing unit having one input coupled to an output of said forward Kalman Filter and a second input connected to the output of said backward Kalman Filter; and
    a control unit coupled to the output of said motion and reference detector, said control unit controlling the operation of said forward Kalman Filter, said backward Kalman Filter, and said smoothing unit.

2. An apparatus for providing accurate position of a moving object in an indoor environment, as claimed in claim 1, wherein said IMU comprising:

one or more gyroscopic units, and
one or more accelerometer units.

3. An apparatus for providing accurate position of a moving object in an indoor environment, as claimed in claim 1, wherein said COT comprising:
an angle estimator coupled to the outputs from the IMU, and
a rotation unit coupled to the outputs from said IMU and the output of said angle estimator.

4. An apparatus for providing accurate position of a moving object in an indoor environment as claimed in claim 1, wherein said forward Kalman Filter comprising:
a process and measurement model that models the movement of the object along an axis of the target co-ordinate system, the relation between acceleration and position, and accelerometer imperfections; and
a set of Kalman Filter gains whose setting is derived from the covariance matrix of the state-vector estimation error.

5. An apparatus for providing accurate position of a moving object in an indoor environment as claimed in claim 4, wherein:
said process and measurement model comprises four integrators providing estimates for the position, velocity, and acceleration of the object, and for the accelerometer bias; and
said set of Kalman Filter gains comprises eight gains.

6. An apparatus for providing accurate position of a moving object in an indoor environment as claimed in claim 1, wherein said backward Kalman Filter comprising
a filter structure as defined for said forward Kalman Filter; and
means for backward processing in time the recorded said rotated accelerometer measurements and said reference position signal, starting with the acceleration and velocity estimates set to zero in said backward Kalman Filter.

7. An apparatus for providing accurate position of a moving object as claimed in claim 1, wherein said smoothing unit combines the estimates of said forward and backward Kalman Filters by weighting the estimates in accordance to the covariance matrices of the corresponding state vector estimation error.

8. An apparatus for providing accurate position of a moving object as claimed in claim 1, wherein said motion and reference detector comprising
a sampling device for sampling the absolute value of said rotated accelerometer measurements;
an averaging device for averaging a given number of consecutive samples; and
a motion detecting device for identifying motion based on said average value being above a defined threshold.

9. A method for accurately determining the position of a moving object in an indoor environment using a combination of an Inertial Measurement Unit (IMU) and a Reference Positioning System (RPS), comprising the steps of:
obtaining reference position data from said RPS;
obtaining additional data on the moving object from said IMU; and
estimating the position of the moving object from the data obtained from the RPS and the IMU, wherein the position estimation is performed by the steps of:
detecting first event "object motion status" based on said rotated accelerometer measurements, and detecting second event "presence or absence of said reference position signal";
switching between modes of operation depending on said first event and said second event according to:
if object is in motion and said reference position signal is present, then said forward Kalman Filter provides estimates for position, acceleration, and velocity of object, and an estimate for accelerometer bias based on said rotated accelerometer measurements and said reference position signal;
if object is in motion and said reference position signal is absent, then said forward Kalman Filter is reconfigured to reflect absence of reference position measurements in the filter and to freeze the estimate of accelerometer bias to the present value, and then provide estimates for determining position, acceleration, and velocity of object;
if object is in motion, then said rotated acceleration measurements, said reference positioning signal, and said first and second events are recorded for performing forward-backward smoothing at the next stop of the object;
if object is stationary, then the acceleration and velocity estimates in said forward Kalman Filter are set to zero, and said forward Kalman Filter is reconfigured to reflect the stationary object status in the filter; and said forward Kalman Filter, said backward Kalman Filter, and said smoothing unit provide smoothed position estimates by performing forward-backward smoothing based on said recorded rotated acceleration measurements and reference position signal.

10. A method for accurately determining the position of a moving object in an indoor environment as claimed in claim 9, wherein said additional data is determined by the steps of:
estimating angular position of said IMU in body-fixed co-ordinate system based on angular velocity measurements obtained from said IMU,
obtaining accelerometer measurements from said IMU along the x-and y-axis of body-fixed co-ordinate system, and
transforming acceleration measurements into target co-ordinate system using the angular position estimate.

11. A method for accurately determining the position of a moving object in an indoor environment as claimed in claim 9, wherein said position estimation is performed by applying a set of forward Kalman Filters to determine the coordinates of the position.

* * * * *